United States Patent Office 2,816,943
Patented Dec. 17, 1957

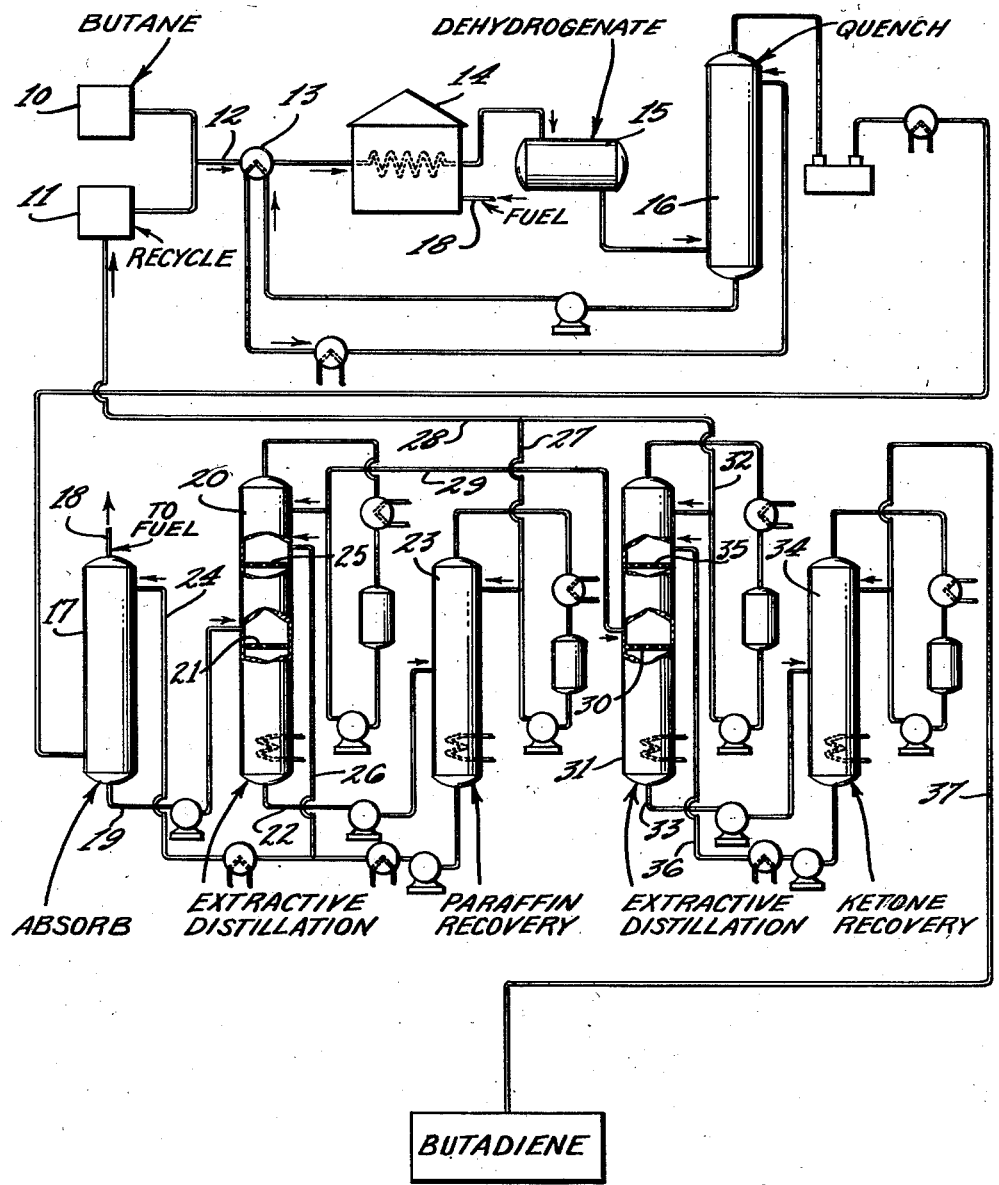

2,816,943

PRODUCING BUTADIENE FROM BUTANE

John W. Delaplaine, Swarthmore, Pa., assignor to Catalytic Construction Company, Wilmington, Del., a corporation of Delaware Application February 4, 1954, Serial No. 408,085

7 Claims. (Cl. 260—680)

This invention relates to the production of butadiene from butane and to a process involving a plurality of extractive distillation steps whereby butadiene is recovered from a mixture of hydrocarbons comprising normal butane, butene-1, cis butene-2, trans butene-2, and butadiene, with or without additional components. By such multiple extractive distillation steps, the butadiene is economically isolated; moreover, mixtures of butane and butenes may be economically recovered for recycling through a dehydrogenating zone and/or the hydrocarbon cuts may be recovered for other purposes.

In certain prior art methods for preparing butadiene, butane is first dehydrogenated to a mixture comprising butenes but substantially no butadiene. After a purification and separation process, the butane is recycled through the primary dehydrogenating zone and the butenes are passed through a butadiene formation chamber. The tars, light gases and other by-products are removed from the product from the butadiene chamber, and the butadiene is then separated from the butenes.

A greatly improved procedure for the preparation of butadiene from butane employs a single stage dehydrogenation of the butane to a mixture comprising butadiene. This single step method is described in an article entitled "Houdry dehydrogenation process" by G. F. Hornaday in the September 1953 issue of Petroleum Refiner.

Heretofore difficulty has been encountered in separating mixtures consisting principally of hydrocarbons of 4-carbon atoms, sometimes referred to as $C_4$ hydrocarbons. It is not feasible to employ ordinary distillation for completely separating some of these complex mixtures. Methods such as azeotropic distillation, solvent extraction, adsorption on solids and extractive distillation have been proposed. Solvent extraction and/or extractive distillation are currently employed industrially for separating mixtures in the intermediate stages of butadiene preparation. Various modifications of a plurality of stages of extractive distillation have been proposed for the recovery of butadiene from various mixtures.

According to the present invention a mixture of $C_4$ hydrocarbons containing a principal amount of butane and less butadiene than butenes is separated to recover butadiene and a recycle stock by subjecting the mixture to a first stage extractive distillation employing a paraffin oil having a boiling point of from about 155° F. to 345° F. and substantially free from olefins and aromatic compounds and by subjecting the overhead from the first extractive distillation to a second extractive distillation employing as the extractive agent a $C_3$, $C_4$ or $C_5$ aliphatic ketone such as acetone, methyl ethyl ketone, methyl propyl ketone, diethyl ketone, acetylacetone, or mixtures thereof with or without small amounts of water. By this combination of extractive distillation steps, it is possible to recover butadiene and a recycling stock from the crude product from a single stage dehydrogenator very economically. The over-all operating cost and the equipment cost are considerably less than those required by previous industrial separation procedures suitable for recovering butadiene from a mixture containing a principal amount of butane.

In the accompanying drawing the figure is a schematic flow sheet of a preferred method of practicing the invention.

Several tests have been proposed in previous technical literature to guide the selection of an extractive agent for an extractive distillation. Several of these tests have been based upon criteria such as the deviation in boiling point resulting from an equimolar mixture of the proposed extractive agent with the component to be separated, the critical solution temperature of such a mixture, and the effectiveness of the proposed extractive agent as a selective solvent for the separation of the components by solvent extraction. Such criteria for the selection of the extractive agent have stressed the importance of the relatively high polarity of the extractive agent. This has been particularly true in the extractive distillations utilized in butadiene manufacture.

Some of the recommendations made in previous literature on extractive distillation are violated to achieve surprisingly superior results. The 155°–345° paraffin oils and $C_3$–$C_5$ ketone extractive agents make possible a minimizing of the cost of isolating the desired materials and the cost of heating and cooling of the materials in process.

According to the criteria previously employed in selecting an extractive agent, the boiling point of the extractive agent is desirably only about 20° or 25° higher than that of the components to be separated. Although normal pentane has a boiling point near that of the $C_4$ hydrocarbons, and accordingly by previous standards would appear best as a paraffin extractive agent, important advantages are achieved by conducting a preliminary extractive distillation in the presence of a higher boiling paraffin, such as normal hexane, normal heptane, normal octane, normal decane, or paraffin mixtures having a boiling point range not less than about 155° and not greater than about 345° F. Such extractive agents, conveniently designated as paraffin oils having a boiling point not less than about 155° F. and not greater than about 345° F. whether mixtures or pure compounds such as normal hexane or normal decane are substantially free from olefins and aromatic compounds. Such 155°–345° paraffin oils are unusually effective and quite inexpensive as extractive agents for the preliminary extractive distillation. Moreover, the $C_4$ hydrocarbons are stripped quite readily from 155–345° F. B. P. paraffin oils, without entrainment of significant amounts of the extractive agent in the gas stream comprising the $C_4$ hydrocarbons. In order to minimize tar formation in the dehydrogenator and for other reasons, it is quite desirable that the recycle stock be substantially free from traces of pentane. A very precise fractionation, requiring a column of many plates with a high reflux ratio, and involving a high cost for pentane volatilization and condensation, would be necessary if a $C_4$ hydrocarbon recycle stock were separated from normal pentane.

By the use of the indicated hydrocarbon or mixture boiling in the range of from 155° to 345° F. as the paraffin oil extractive agent, improved results are obtained over those possible in using a gas oil or other high boiling hydrocarbon as the extractive agent. The effectiveness of the extractive agent is dependent to a considerable extent upon the mol ratio of the extractive agent at the extractant feed tray. The higher molecular weight gas oil requires a significantly larger quantity of gas oil than required for an equal molar quantity of hexane or other paraffin oil within 155–345° F. B. P. range. The smaller quantity of extractive agent is significant particularly because of requiring equipment of smaller size for handling the same quantity of hydrocarbon mixture involved in the butadiene manufacture.

The paraffin oil extractive agent is present in a concentration of from about 0.40 to about 0.70 mole fraction at the extractant feed point of the extractive distillation column. Similarly at the ketone extractant feed tray, the extractant concentration should be maintained at about 0.80 to 0.85 mole fraction.

The hydrocarbon mixture from the dehydrogenation zone is extractively distilled in the presence of the paraffin oil, thereby obtaining overhead a stream of butadiene, butene-1 and a normal butane and a bottom solution comprising butane, and some butene-1, cis butene-2 and trans butene-2 dissolved in the paraffin oil. In the second stage, the overhead stream from the first column is extractively distilled in the presence of an aliphatic ketone such as acetone, methyl ethyl ketone, acetylacetone, diethyl ketone, methyl propyl ketone, or mixtures thereof, either anhydrous or not more than 50 mole percent water, whereby butadiene is absorbed in the aliphatic ketone leaving the bottom of the second extractive distillation column, and the non-butadiene materials are recovered as a stream leaving the top thereof. The butadiene is recovered from the ketone by a suitable step such as ordinary distillation.

Similarly the solution of butane and butenes in the normal hexane or similar paraffin oil is distilled to remove the butane and butenes which can be employed as recycle stock. The unconjugated hydrocarbon material recovered from the second extractive distillation column is ordinarily employed as recycle stock in the single stage dehydrogenation procedure. It is not necessary to catalytically convert the butene-1 to butene-2 prior to the dehydrogenation to butadiene in the single stage catalytic chamber. If desired, the butene-1 or the mixture of cis and trans butene-2 can be isolated and sold as technical grade olefins instead of being employed for recycle purposes.

By employing 155–345° paraffin oil and $C_3$–$C_5$ ketones as extractive agents in two stages of extractive distillation, the relative volatility of the butadiene is promoted and repressed respectively at the lowest over-all costs. Prior literature on extractive distillation has tended to emphasize the absorption of components in solvents. By the present invention, the characteristics of a multi-component mixture are utilized in the two stages of extractive distillation to isolate reasonably pure butadiene and a recycle stock with equipment of minimum size, investment, and operating costs.

Paraffin oils are relatively unsatisfactory extractive agents for separating alkanes from olefins. Similarly, paraffin oils would not serve well in the extractive distillation for the separation of an olefin from a diolefin.

By the present invention, a mixture containing a principal amount of normal butane is roughly separated in the first stage of extractive distillation, not for the purpose of eliminating all traces of normal butane from the overhead, but for the purpose of minimizing the cost of operation of the secondary extractive distillation. Conditions are so controlled as to enhance the volatility of the butadiene in the first stage of extractive distillation. Although paraffin oils are generally not satisfactory for removing olefins by extractive distillation, an economical operation is attained by controlling the overhead stream so that in addition to the butene-1 and butadiene, it also contains a significant mole fraction of normal butane, but substantially no butene-2. The paraffin oil extractive distillation thus makes feasible an economical second stage extractive distillation. Although paraffin oils have been proposed as extractive agents, the industrial extractive distillations have generally been conducted employing polar solvents. In order to achieve the sharp and complete separation proposed by previous extractive distillations with paraffin oils, such large quantities of paraffin oil have been necessary that the procedure has been quite costly. By the present invention, a relatively small amount of paraffin oil extractive agent is employed.

In the second stage extractive distillation, the butadiene relative volatility is repressed sufficiently but only sufficiently to minimize the economic loss of butadiene in the recycle stock recovered overhead. Inasmuch as the normal volatility relationships of butane and butadiene are reversed in the second stage of extractive distillation, a high mole ratio of extractant to hydrocarbon must be maintained. However, the absence of butene-2 in the second stage extractive distillation particularly simplifies it. Inasmuch as the quantity of hydrocarbon mixture processed is so much less in the second than in the first stage extractive distillation, the cost of maintaining approximately 80 to 85 mole percent of ketone extractant is not prohibitive.

The first extractive distillation is so controlled that the overhead stream therefrom comprises a significant amount of butane, which control is preferably achieved by maintaining at the extractant feed tray a mole fraction of 155–345° F. paraffin oil less than about 0.70 and possibly as low as 0.40.

In a preferred embodiment of the invention, the paraffin oil employed as the extractant in the first stage extractive distillation is also utilized as the absorbing oil in separating the normal $C_4$ hydrocarbons from hydrogen. Thus the butadiene is one of the components absorbed in the 155–345° F. paraffin oil in the absorber. Instead of desorbing all $C_4$ hydrocarbons from the absorbing oil and thereafter separating them, as in conventional methods, the absorbing oil passes through the first extractive distillation column. Additional 155–345° F. paraffin oil is introduced into the extractive distillation column, in which a mixture comprising substantially all of the butadiene, and significant amounts of butane and butene-1 are volatilized. Most of the product from the dehydrogenating chamber instead of being volatilized twice (in the desorber of the hydrogen separator and subsequently in the purification apparatus) is volatilized only once.

In order to describe more fully some of the prior art practices, controls, and embodiments of the advantages achieved by the present invention, reference is made to several examples.

*Example I*

As shown in the figure, butane from a butane storage tank 10 is mixed with recycle stock from a recycle storage tank 11 and passed through a feed pipe 12 through a heat exchanger 13 to a furnace 14. In the furnace the mixture of straight chain four carbon hydrocarbons is heated to an elevated temperature such as 1125° F. The hot gas stream of $C_4$ hydrocarbons is pumped through a dehydrogenating chamber 15 maintained at a pressure of approximately 8 millimeters pressure and at a space rate of approximately 1.5. The volume of liquid hydrocarbon fed to the catalyst chamber per hour is approximately one and one half times the volume of the catalyst. The dehydrogenating catalyst is preferably chromia on alumina but may be any regeneratable dehydrogenating catalyst effective in forming substantial yields of butadiene from butane under such conditions. The product from the dehydrogenating chamber consists of a mixture containing about 1.9% by weight (approximately 37% by volume) hydrogen. During the operation of the method, the coke formed in the dehydrogenating chamber constitutes approximately 2.7% by weight of the butane consumed. Small amounts of hydrocarbons lighter than the $C_4$ hydrocarbons, conveniently designated as a propane cut, and heavier products, conveniently designated as pentane cut, are formed. It is convenient to treat the gaseous product from the dehydrogenating as consisting essentially of a mixture of normal $C_4$ hydrocarbons and hydrogen, and to ignore the minor amounts of propane cut and pentane cut.

The gas stream from the dehydrogenating chamber 15 enters a quench tower 16 where it is quickly cooled to a moderate temperature. The quench oil may be recirculated through the heat exchanger 13 to heat the charge stock prior to entering the furnace 14. The gas from the quench tower is processed to remove entrained quench oil, compressed to from five to ten atmospheres pressure, cooled to about room temperature, and then subjected to an absorbing tower 17 in which the $C_4$ hydrocarbons are absorbed in a liquid paraffin oil having a boiling point range greater than about 155° F. and less than about 345° F. such as normal hexane. Under these high pressure, low temperature conditions, substantially all of normal $C_4$ hydrocarbons are absorbed in the paraffin oil.

One of the principal purposes of the absorbing tower 17 is to remove the hydrogen from the gas stream. Although hydrogen constitutes a relatively small weight percent (e. g. about 1.9%) of the gaseous product from the catalytic chamber, it represents a relatively large mole percent (approximately 37%) thereof. The hydrogen, propane cut, and other light gases which are not absorbed by the solvent in the absorbing tower 17 can pass through line 18 to the furnace 14 and can be employed as a fuel for the furnace.

From the absorbing tower 17, a solution of the $C_4$ hydrocarbons in the absorbing oil passes through line 19 to an extractive distillation tower 20. It is convenient to consider the mixture to be separated as consisting essentially of

| | Mole percent |
|---|---|
| Butene-1 | 13.0 |
| Butadiene | 12.0 |
| Normal butane | 51.0 |
| Trans butene | 15.0 |
| Cis butene | 9.0 |

The designated concentrations are approximate, and each component may be present in an amount somewhat different from that specified without significantly affecting the advantageous procedure.

It is convenient to discuss the operation of a separation apparatus processing 100 pound moles of such a mixture per unit time. In a typical industrial installation adapted to separate about 60,000 pounds of $C_4$ hydrocarbons per hour, the 100 moles of normal $C_4$ hydrocarbons would represent approximately five minutes operation, but in larger installations the time for processing 100 mols would be correspondingly smaller.

The separation procedure is adapted to recover substantially all of the 13.0 moles of butadiene, and to recover substantially all of the 87.0 moles of recycles hydrocarbons at a low over-all cost by a two stage extractive distillation.

After the hydrogen is separated from the reaction product in the absorber 17, the mixture of the five kinds of normal $C_4$ hydrocarbons, entirely dissolved in the paraffin oil under the high pressure, low temperature conditions of the absorber, passes through line 19 to a mixture feed tray 21 in a central portion of the extractive distillation column 20, maintained at a pressure of about five to ten atmospheres. In the extractive distillation column 20 additional quantities of fresh paraffin oil (B. P. 155–345° F. such as normal hexane) are added and the temperature conditions are maintained to bring about a volatization of substantially all of the butadiene. Thus, the stream leaving the bottom of the first extractive distillation tower 20 by line 22 is substantially free from butadiene. This paraffin oil solution of butane, substantially all of the initial trans butene and cis butene and a portion of the butene-1, enters a distillation tower 23, where it is separated into fresh paraffin oil and a butene-butane mixture. A paraffin oil stream leaves the bottom of the distillation tower 23, which stream is divided into two parts, one of which supplies the absorber 17 with fresh paraffin oil through line 24, and the other of which supplies an extractant feed tray 25 of the first extractive distillation tower 20 through line 26. A mixture of butane, substantially all of the initial cis and trans butene, a portion of the initial butene-1, but subsantially no butadiene is withdrawn from the top of the column 23 and passes by overhead line 27 to the recycle trunk line 28, and thence to the recycle accumulator 11.

From the top of the first extractive distillation tower 20, there is withdrawn a stream through line 29 which stream contains substantially all of the butadiene produced by the process. This stream of line 29 also contains a significant portion of the initial butene-1, but only a very small fraction of the initial cis and trans butenes.

Of particular importance, the stream in line 29 contains a significant amount of butane. Because the separation in the extractive distillation tower 20 is merely sufficient to remove substantially all of the butadiene from the bottoms, but not necessarily sufficient to remove all of the butane from the overhead stream, great economies are achieved in the operation of this extractive distillation tower 20. The paraffin oil concentration at the extractant feed tray 25 of the column 20 is maintained at least as low as 70 mol percent, and sometimes as low as 40 mol percent, depending in part on the vapor pressure of the paraffin oil. Thus a smaller tower suffices to extractively distill a large quantity of $C_4$ hydrocarbons than would be the case if the paraffin oil extractant molar concentration were 85% or 90%.

From the first extractive distillation tower 20, this overhead stream consisting essentially of butadiene, butene-1 and butane passes by line 29 to a mixture feed tray 30 in the central portion of a second extractive distillation tower 31. Here the relative volatility of the butadiene is so effectively reduced that the butane, which is a higher boiling and less volatile component passes overhead with the butene-1 in line 32 and substantially all of the initial butadiene leaves the tower 31 through the bottom line 33. The butadiene, dissolved in the ketone extractive agent, passes through line 33 to a ketone recovery distillation tower 34, from the bottom of which purified extractant is recovered and recirculated to an extractant feed tray 35 of the column 31 through line 36. Acetone containing about 18 mole percent water is a preferred extractant. An overhead stream 37 constitutes a technical grade of butadiene, substantially free from butane, butene-1, cis butene and/or trans butene.

The stream 32 withdrawn from the top of the second extractive distillation tower 31, although containing butene-1 as the principal component and butane as the next most abundant component might also contain tiny traces of cis butene, trans butene and any miscellaneous impurities such as isobutane, isobutene, propene, ethene, methane and the like. The miscellaneous impurities are generally present in such small amounts that the stream 32 may be fed directly to the recycle trunk line 28 going to the recycle accumulator 11.

The butadiene in line 37 is pure enough for most purposes. If desired any propyne, butyne-1, butyne-2, and related acetylenes are removed and/or converted to less troublesome materials by one of the conventional procedures for disposing of acetylenes. The purified, acetylene-free butadiene can, if desired, be mixed with a regulated amount of inhibitor from an inhibitor supply line before the butadiene enters a product storage tank.

The temperature of the top of the extractive distillation columns 20 and 31 is adjusted from about 100° to about 150° F. in accordance with the available cooling water. All four of the columns 20, 23, 31 and 34 are operated at a pressure within the range from about five to ten atmospheres in accordance with the reflux condenser temperature. A pressure of approximately eight atmospheres has been found optimum for many conditions.

The temperature of the bottom of the first extractive distillation column 20 is affected by the choice of paraffin oil, but is significantly below the boiling point of the pure extractant at the pressure employed. The bottom temperature in each of the extractive distillation columns 20 and 31 is within the range from about 200° to about 300° F.

*Example II*

Butadiene is prepared from butane by a method generally similar to that of Example I, but employing normal decane as the primary extractant and methyl ethyl ketone containing approximately 10% by weight water as the extractant for the secondary extractive distillation. Throughout most steps, the temperatures are somewhat higher than in Example I.

*Example III*

Butadiene is prepared from butane by a method generally similar to that of Example I except that the product from the absorber 17 is separately subjected to a distillation to strip off a mixture of $C_4$ hydrocarbons, which mixture is then subjected to the two stage extractive distillation. A storage tank or accumulator for such a mixture of $C_4$ hydrocarbons may be employed to expedite separate shut-down of the absorbing and extractive distillation units.

*Example IV*

A mixture of normal $C_4$ hydrocarbons containing a principal amount of butane is separated to recover butadiene employing a casing head gasoline B. P. 170–325° F. as the paraffin oil extractive agent and substantially anhydrous acetone as the ketone extractant.

*Example V*

A mixture of normal $C_4$ hydrocarbons containing a principal amount of butane (that is, more normal butane than any other component) is separated to recover butadiene employing 40 mole percent normal octane at the extractant feed tray of the first extractive distillation, and a mixture of diethyl ketone, methyl propyl ketone, acetylacetone, methyl ethyl ketone, acetone, and about 5% water as the extractant in the secondary extractive distillation.

Obviously many modifications and variations of the invention as hereinbefore set forth may be made without departing from the spirit and scope thereof, and therefore only such limitations should be imposed as are indicated in the appended claims.

What is claimed is:

1. A method of producing butadiene from normal butane which includes the steps of subjecting a gas stream containing normal butane as the principal hydrocarbon constituent to the action of a dehydrogenating catalyst at an elevated temperature and at sub-atmospheric pressure, rapidly cooling the effluent from the dehydrogenation; removing hydrogen from such effluent; subjecting the hydrogen-freed effluent to a first stage extractive distillation in the presence of a liquid paraffin oil having a boiling point range not lower than about 155° F. nor higher than 345° F., said hydrogen-freed effluent consisting essentially of a principal amount of normal butane and significant amounts of butadiene, butene-1, cis-butene-2 and trans-butene-2; withdrawing an overhead stream consisting essentially of substantially all of the butadiene, much of the butene-1 and a significant amount of normal butane; withdrawing a bottom stream as a paraffin oil solution of a mixture consisting essentially of most of the normal butane, cis-butene-2 and trans-butene-2 and some butene-1; stripping the normal butane and normal butenes from the paraffin oil and recycling the normal butane and normal butenes from the paraffin oil and recycling the normal butane and normal butenes to dehydrogenation; subjecting the stream of butadiene, butene-1 and normal butane to an extractive distillation in the presence of ketone having from three to five carbon atoms, whereby the butene-1 and normal butane pass overhead and the butadiene is absorbed in the ketone; and thereafter recovering the butadiene from the ketone.

2. The method of claim 1 in which the paraffin oil is recirculated in the first extractive distillation to maintain in the liquid zone at which the paraffin oil is fed, a mole percentage concentration of the paraffin oil between 40% and 70%.

3. A method of separating butadiene from a mixture comprising a principal amount of normal butane, smaller but significant amounts of each of cis-butene 2, trans-butene-2 and butene-1 and a quantity of butadiene less than the total butene content which includes the steps of subjecting said mixture to an extractive distillation in the presence of a paraffin oil having a boiling point range not lower than about 155° F. nor higher than about 345° F. recirculating the paraffin oil to maintain a mole percentage concentration of the paraffin oil between 40% and 70% in the liquid zone at which the paraffin oil is fed; withdrawing a bottom stream comprising paraffin oil, normal butane and normal butenes; withdrawing overhead a stream consisting essentially of a principal amount of butadiene, butene-1 and normal butane; subjecting said overhead stream to an extractive distillation in the presence of ketone having from three to five carbon atoms whereby the butene-1 and normal butane pass overhead and the butadiene is absorbed by the ketone; and recovering the butadiene from the ketone.

4. The method of separating butadiene from hydrocarbon mixtures characterized by a principal amount of normal butane which includes the steps of first subjecting the mixture to extractive distillation in the presence of a paraffin oil having a boiling point range not less than about 155° and not greater than about 345° F.; and subjecting the overhead stream not absorbed by the paraffin oil, said overhead stream being characterized by the presence of butadiene and significantly more butane than butene-2, to an extractive distillation in the presence of ketone having from three to five carbon atoms, whereby there is obtained a solution of the butadiene in the ketone.

5. The method of isolating butadiene from a mixture containing a principal amount of normal butane, a smaller amount of butenes, and a still smaller amount of butadiene which includes the steps of extractively distilling the entire mixture in the presence of normal hexane; withdrawing a stream not absorbed by the hexane and subjecting said stream to extractive distillation in the presence of aqueous acetone containing not more than 50 mol percent water, whereby there is obtained an aqueous acetone solution of butadiene.

6. The method of producing butadiene from normal butane which includes the steps of subjecting a gas stream containing more normal butane than normal butenes to a dehydrogenating chamber at an elevated temperature, rapidly quenching the gas stream from the dehydrogenating chamber, absorbing $C_4$ hydrocarbons from the gas stream in a paraffin oil having a boiling point range not lower than 155° F. nor higher than 345° F. under a pressure of from about 5 to about 10 atmospheres at a temperature sufficiently low to absorb substantially all of the butadiene from said gas stream, subjecting said paraffin oil solution of $C_4$ hydrocarbons to an extractive distillation at a higher temperaure than employed in said absorbing step, recirculating additional paraffin oil to maintain at the extractant feed zone a mole percentage concentration of paraffin oil of from 40% to 70% whereby there is withdrawn an overhead stream consisting essentially of a principal amount of butadiene, some butene-1 and a significant amount of normal butane, subjecting said overhead stream to a second extractive distillation in the presence of an aliphatic ketone having from three to five carbon atoms whereby there is withdrawn a bottom stream of butadiene in ketone, recovering the butadiene from the ketone and recovering substantially all of the non-butadiene $C_4$ hydrocarbons as a recycle stock consisting essentially of a principal amount of normal butane and a significant amount of normal butenes from the bottom stream from the paraffin oil extractive distillation and the overhead stream from the ketone extractive distillation, mixing said recycle stock with normal butane, and subjecting said mixture to said dehydrogenating chamber.

7. The method of preparing butadiene from normal butane which includes the steps of subjecting a mixture of butane and recycle stock at an elevated temperature to a dehydrogenating chamber to form a mixture consisting essentially of hydrogen, butane, butene-1, cis-butene-2, trans-butene-2 and butadiene; quenching said mixture; compressing and cooling said mixture; removing hydrogen from said mixture to form a mixture of $C_4$ hydrocarbons having the approximate molar percentages

| | Percent |
|---|---|
| Butene-1 | 13 |
| Butadiene | 12 |
| Normal butane | 51 |
| Trans-butene-2 | 15 |
| Cis-butene-2 | 9 | extractively distilling said $C_4$ hydrocarbon mixture in the presence of a paraffin oil at a pressure of approximately eight atmospheres, with a bottom temperature of from about 200 to 300° F.; introducing a paraffin oil having an atmospheric boiling point range greater than 155° F. and less than 345° F. at a rate to maintain a mole percentage concentration of paraffin oil at the liquid zone of introducing the paraffin oil of from 40% to 70%; withdrawing an overhead stream containing butadiene, butene-1 and normal butane from said extractive distillation in the presence of a paraffin oil; extractively distilling said stream in the presence of a ketone having from three to five carbon atoms at a pressure of approximately eight atmospheres with a bottom temperature of from about 200 to 300° F., introducing the ketone extractant at a rate to maintain a mole percentage concentration of extractant at the liquid zone of introducing the ketone extractant of from 80% to 85%; withdrawing an underneath stream of butadiene in ketone; and recovering a recycle stock consisting of normal butane and normal butenes from the bottom stream from the primary and the overhead stream from the secondary extractive distillations.

References Cited in the file of this patent

UNITED STATES PATENTS

| 2,412,911 | Scheeline | Dec. 17, 1946 |
| 2,433,286 | McKinnis | Dec. 23, 1947 |
| 2,434,424 | Morris et al. | Jan. 13, 1948 |
| 2,436,600 | Reeves | Feb. 24, 1948 |
| 2,750,435 | Fetchin | June 12, 1956 |